United States Patent
Pedersen et al.

(10) Patent No.: US 11,902,806 B2
(45) Date of Patent: Feb. 13, 2024

(54) MACHINE LEARNING BASED ANTENNA PANEL SWITCHING

(71) Applicant: NOKIA TECHNOLOGIES OY, Espoo (FI)

(72) Inventors: Klaus Ingemann Pedersen, Aalborg (DK); István Zsolt Kovács, Aalborg (DK); Ali Esswie, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 385 days.

(21) Appl. No.: 17/392,877

(22) Filed: Aug. 3, 2021

(65) Prior Publication Data
US 2022/0046447 A1    Feb. 10, 2022

(30) Foreign Application Priority Data
Aug. 4, 2020 (FI) ...................................... 20205781

(51) Int. Cl.
*H04W 24/08* (2009.01)
*H04B 17/336* (2015.01)
*G06N 20/00* (2019.01)

(52) U.S. Cl.
CPC ............ *H04W 24/08* (2013.01); *G06N 20/00* (2019.01); *H04B 17/336* (2015.01)

(58) Field of Classification Search
None
See application file for complete search history.

(56) References Cited

U.S. PATENT DOCUMENTS

| | | | |
|---|---|---|---|
| 9,972,339 B1* | 5/2018 | Sundaram | G01S 3/8083 |
| 10,666,342 B1 | 5/2020 | Landis et al. | |
| 11,677,454 B2* | 6/2023 | Pezeshki | H04B 7/0695 |
| | | | 370/329 |
| 11,689,298 B1* | 6/2023 | Pettus | H01Q 1/1257 |
| | | | 370/329 |
| 2019/0007122 A1* | 1/2019 | Furuskog | H04B 7/0695 |
| 2019/0074886 A1* | 3/2019 | Yoon | H04B 7/0617 |
| 2019/0219982 A1* | 7/2019 | Klassen | G05B 19/41875 |
| 2020/0067615 A1 | 2/2020 | Ghanbarinejad et al. | |

(Continued)

FOREIGN PATENT DOCUMENTS

| | | | | |
|---|---|---|---|---|
| WO | WO 2012/072445 A1 | 6/2012 | | |
| WO | WO 2019/029802 A1 | 2/2019 | | |
| WO | WO-2019029802 A1 * | 2/2019 | ............ | G06N 20/00 |

OTHER PUBLICATIONS

Extended European Search Report dated Jan. 4, 2022 corresponding to European Patent Application No. 21189112.2.

(Continued)

*Primary Examiner* — Christopher T Wyllie
(74) *Attorney, Agent, or Firm* — SQUIRE PATTON BOGGS (US) LLP

(57) ABSTRACT

Disclosed is a method comprising using a machine learning algorithm to select an antenna panel from a plurality of antenna panels. A first long-term reward value associated with the selected antenna panel is determined based at least partly on one or more first signals received on the selected antenna panel. A second signal is then transmitted or received via the selected antenna panel, if the first long-term reward value exceeds one or more second long-term reward values associated with at least a subset of the plurality of antenna panels.

20 Claims, 7 Drawing Sheets

(56) References Cited

U.S. PATENT DOCUMENTS

| | | | |
|---|---|---|---|
| 2020/0077285 A1* | 3/2020 | Yu | H04W 72/12 |
| 2020/0106563 A1* | 4/2020 | Akoum | H04B 7/0691 |
| 2020/0186227 A1* | 6/2020 | Reider | H04B 7/0695 |
| 2020/0322814 A1* | 10/2020 | Tofighbakhsh | H04W 24/02 |
| 2020/0374960 A1* | 11/2020 | Deenoo | H04W 74/0833 |
| 2021/0132223 A1* | 5/2021 | Hennersperger | G01S 15/8915 |
| 2021/0242928 A1* | 8/2021 | Park | H04B 7/088 |
| 2021/0326726 A1* | 10/2021 | Wang | G06N 3/084 |
| 2021/0376902 A1* | 12/2021 | Burström | H04B 7/0695 |
| 2022/0046447 A1* | 2/2022 | Pedersen | G06N 20/00 |
| 2022/0407574 A1* | 12/2022 | Goto | H04B 7/0691 |
| 2023/0156497 A1* | 5/2023 | Zhang | H04L 5/0062 370/252 |
| 2023/0275630 A1* | 8/2023 | Liu | H04B 7/0802 455/507 |

OTHER PUBLICATIONS

Li Yu-Ngok Ruyue et al., "Beam Management in Millimeter-Wave Communications for 5G and Beyond," IEEE Access, IEEE, vol. 8, Dec. 31, 2019, pp. 13282-13293, XP011767596.

Fei Yu et al., "A new QoS provisioning method for adaptive multimedia in cellular wireless networks," IFOCOM 2004. Twenty-Third Annual Joint Conference of the IEEE Computer and Communications Societies, IEEE, vol. 3, Mar. 7, 2004, pp. 2130-2141, XP010740568.

Daniel Hennes et al., "Formalizing Multi-state Learning Dyanmics," Web Intelligence and Intelligent Agent Technology, 2008 IEEE/WIC/ACM International Conference, IEEE, Dec. 9, 2008, pp. 266-272, XP058125592.

Finnish Office Action and Search Report dated Dec. 28, 2020 corresponding to Finnish Patent Application No. 20205781.

Inaki Berenguer et al., "Adaptive MIMO Antenna Selection via Discrete Stochastic Optimization," IEEE Transactions on Signal Processing, vol. 53, No. 11, Nov. 2005.

3GPP TS 38.300 V16.0.0 (Dec. 2019), Technical Specification, 3rd Generation Partnership Project; Technical Specification Group Radio Access Network; NR; NR and NG-RAN Overall Description; Stage 2 (Release 16), Dec. 2019.

3GPP TS 23.501 V16.5.0 (Jul. 2020), Technical Specification, 3rd Generation Partnership Project; Technical Specification Group Services and System Aspects; System architecture for the 5G System (5GS); Stage 2 (Release 16), Jul. 2020.

* cited by examiner

MACHINE LEARNING BASED ANTENNA PANEL SWITCHING

FIELD

The following exemplary embodiments relate to wireless communication.

BACKGROUND

As resources are limited, it is desirable to optimize the usage of network resources. A terminal device may be utilized to enable better usage of resources and enhanced user experience to a user of the terminal device.

SUMMARY

The scope of protection sought for various exemplary embodiments is set out by the independent claims. The exemplary embodiments and features, if any, described in this specification that do not fall under the scope of the independent claims are to be interpreted as examples useful for understanding various exemplary embodiments.

According to an aspect, there is provided an apparatus comprising at least one processor, and at least one memory including computer program code, wherein the at least one memory and the computer program code are configured, with the at least one processor, to cause the apparatus to: use a machine learning algorithm to select an antenna panel from a plurality of antenna panels; determine a first long-term reward value associated with the selected antenna panel based at least partly on one or more first signals received on the selected antenna panel; and transmit or receive a second signal via the selected antenna panel, if the first long-term reward value exceeds one or more second long-term reward values associated with at least a subset of the plurality of antenna panels.

According to another aspect, there is provided an apparatus comprising means for using a machine learning algorithm to select an antenna panel from a plurality of antenna panels; determining a first long-term reward value associated with the selected antenna panel based at least partly on one or more first signals received on the selected antenna panel; and transmitting or receiving a second signal via the selected antenna panel, if the first long-term reward value exceeds one or more second long-term reward values associated with at least a subset of the plurality of antenna panels.

According to another aspect, there is provided a system comprising at least a terminal device and a base station, wherein the terminal device is configured to: use a machine learning algorithm to select an antenna panel from a plurality of antenna panels; receive one or more first signals from the base station via the selected antenna panel; determine a first long-term reward value associated with the selected antenna panel based at least partly on the one or more first signals received on the selected antenna panel; and transmit or receive a second signal via the selected antenna panel, if the first long-term reward value exceeds one or more second long-term reward values associated with at least a subset of the plurality of antenna panels; and wherein the base station is configured to: transmit the one or more first signals to the terminal device; and receive or transmit the second signal from or to the terminal device.

According to another aspect, there is provided a system comprising at least a terminal device and a base station, wherein the terminal device comprises means for: using a machine learning algorithm to select an antenna panel from a plurality of antenna panels; receiving one or more first signals from the base station via the selected antenna panel; determining a first long-term reward value associated with the selected antenna panel based at least partly on the one or more first signals received on the selected antenna panel; and transmitting or receiving a second signal via the selected antenna panel, if the first long-term reward value exceeds one or more second long-term reward values associated with at least a subset of the plurality of antenna panels; and wherein the base station comprises means for: transmitting the one or more first signals to the terminal device; and receiving or transmitting the second signal from or to the terminal device.

According to another aspect, there is provided a method comprising using a machine learning algorithm to select an antenna panel from a plurality of antenna panels; determining a first long-term reward value associated with the selected antenna panel based at least partly on one or more first signals received on the selected antenna panel; and transmitting or receiving a second signal via the selected antenna panel, if the first long-term reward value exceeds one or more second long-term reward values associated with at least a subset of the plurality of antenna panels.

According to another aspect, there is provided a computer program comprising instructions for causing an apparatus to perform at least the following: use a machine learning algorithm to select an antenna panel from a plurality of antenna panels; determine a first long-term reward value associated with the selected antenna panel based at least partly on one or more first signals received on the selected antenna panel; and transmit or receive a second signal via the selected antenna panel, if the first long-term reward value exceeds one or more second long-term reward values associated with at least a subset of the plurality of antenna panels.

According to another aspect, there is provided a computer readable medium comprising program instructions for causing an apparatus to perform at least the following: use a machine learning algorithm to select an antenna panel from a plurality of antenna panels; determine a first long-term reward value associated with the selected antenna panel based at least partly on one or more first signals received on the selected antenna panel; and transmit or receive a second signal via the selected antenna panel, if the first long-term reward value exceeds one or more second long-term reward values associated with at least a subset of the plurality of antenna panels.

According to another aspect, there is provided a non-transitory computer readable medium comprising program instructions for causing an apparatus to perform at least the following: use a machine learning algorithm to select an antenna panel from a plurality of antenna panels; determine a first long-term reward value associated with the selected antenna panel based at least partly on one or more first signals received on the selected antenna panel; and transmit or receive a second signal via the selected antenna panel, if the first long-term reward value exceeds one or more second long-term reward values associated with at least a subset of the plurality of antenna panels.

BRIEF DESCRIPTION OF THE DRAWINGS

In the following, various exemplary embodiments will be described in greater detail with reference to the accompanying drawings, in which.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A) or new radio (NR, 5G), without restricting the exemplary embodiments to such an architecture, however. It is obvious for a person skilled in the art that the exemplary embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
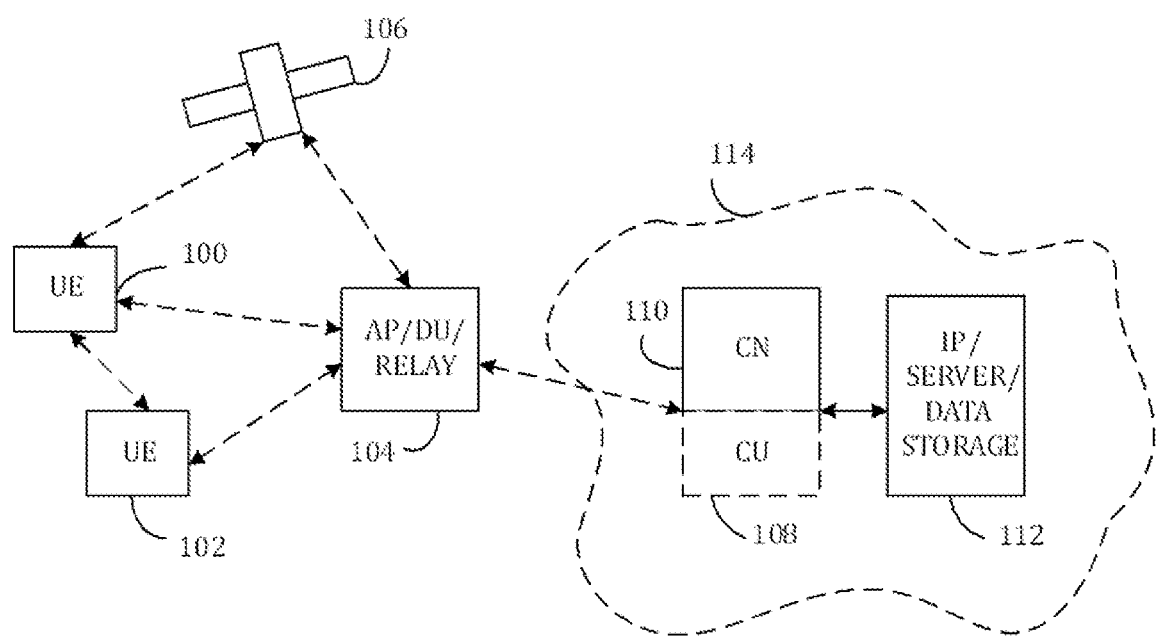
FIG. 1 illustrates an exemplary embodiment of a cellular communication network.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB may be called uplink or reverse link and the physical link from the (e/g)NodeB to the user device may be called downlink or forward link. It should be appreciated that (e/g)NodeBs or their functionalities may be implemented by using any node, host, server or access point etc. entity suitable for such a usage.

A communication system may comprise more than one (e/g)NodeB, in which case the (e/g)NodeBs may also be configured to communicate with one another over links, wired or wireless, designed for the purpose. These links may be used for signaling purposes. The (e/g)NodeB may be a computing device configured to control the radio resources of communication system it is coupled to. The NodeB may also be referred to as a base station, an access point or any other type of interfacing device including a relay station capable of operating in a wireless environment. The (e/g) NodeB may include or be coupled to transceivers. From the transceivers of the (e/g)NodeB, a connection may be provided to an antenna unit that establishes bi-directional radio links to user devices. The antenna unit may comprise a plurality of antennas or antenna elements. The (e/g)NodeB may further be connected to core network 110 (CN or next generation core NGC). Depending on the system, the counterpart on the CN side may be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node may be a layer 3 relay (self-backhauling relay) towards the base station.

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation may be carried out in the cloud. The user device (or in some exemplary embodiments a layer 3 relay node) may be configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G may enable using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave, below 6 GHz-cmWave-mmWave). One of the concepts considered to be used in 5G networks may be network slicing in which multiple independent and dedicated virtual sub-networks (network instances) may be created within the same infrastructure to run services that have different requirements on latency, reliability, throughput and mobility.

The current architecture in LTE networks may be fully distributed in the radio and fully centralized in the core network. The low latency applications and services in 5G may require to bring the content close to the radio which leads to local break out and multi-access edge computing (MEC). 5G may enable analytics and knowledge generation to occur at the source of the data. This approach may require leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It may also be possible that node operations will be distributed among a plurality of servers, nodes or hosts. Application of cloudRAN architecture may enable RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements that may be used may be Big Data and all-IP, which may change the way networks are being constructed and managed. 5G (or new radio, NR) networks may be designed to support multiple hierarchies, where MEC servers may be placed between the core and the base station or nodeB (gNB). It should be appreciated that MEC may be applied in 4G networks as well.

5G may also utilize satellite communication to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may also comprise other apparatuses, such as physical layer relay nodes or other network elements, etc. At least one of the (e/g)NodeBs or may be a Home(e/g)nodeB. Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. In multilayer networks, one access node may provide one kind of a cell or cells, and thus a plurality of (e/g)NodeBs may be required to provide such a network structure.

For fulfilling the need for improving the deployment and performance of communication systems, the concept of "plug-and-play" (e/g)NodeBs may be introduced. A network which may be able to use "plug-and-play" (e/g)Node Bs, may include, in addition to Home (e/g)NodeBs (H(e/g) nodeBs), a home node B gateway, or HNB-GW (not shown in FIG. 1). A HNB Gateway (HNB-GW), which may be installed within an operator's network, may aggregate traffic from a large number of HNBs back to a core network.

A terminal device, which may also be referred to as a UE, may comprise a plurality of antenna panels. However, some UEs may be restricted to having only one antenna panel active at a time for radio reception and/or transmission, since operating multiple simultaneously active antenna panels may increase hardware complexity and/or energy consumption. If only one antenna panel in a plurality of antenna panels is allowed to be active at a time, a mechanism for switching the active antenna panel and performing layer 1, L1, measurements, including L1 filtering, may be required. However, such a mechanism may involve making tradeoffs between serving cell connectivity performance, such as throughput, latency and/or beam failures, and mobility performance, such as handover failure probabilities and/or ping-pong events, i.e. when the UE performs a handover and then directly reconnects back to the source cell. L1 may also be referred to as a physical layer. For example, the UE may provide reference signal received power, RSRP, measurements at L1 when transmitting channel state information, CSI, to a gNB.

Each antenna panel in the plurality of antenna panels may have a directional radiation pattern that points in different spatial directions. The UE may be subject to time-variant rotations and/or movement, and there may be time-variant local scattering and/or blockage taking place, such as a hand that changes position on the UE. A radiation pattern may refer to the variation of the power of the radio waves radiated by an antenna panel as a function of the direction away from the antenna panel, i.e. the way that the antenna panel distributes its energy in space.

During data reception and/or transmission with its serving cell, the UE may use the best antenna panel, i.e. the antenna panel which corresponds to the highest estimated radio signal quality, measured for example as RSRP and/or highest received signal-to-interference-plus-noise ratio, SINR. An antenna panel may comprise an antenna array, i.e. a plurality of antenna elements, wherein the UE may apply beamforming. A base station, such as a gNB, may also be equipped with beamforming, for example grid of beams, GoB, and thus be using medium access control, MAC, based beam tracking. To ensure that the UE is using its best antenna panel for reception and/or transmission towards its serving cell and/or beam, the UE may perform measurements on its other antenna panels as well. For example, the UE may perform measurements on synchronization signal block, SSB, and/or channel state information reference signal, CSI-RS, transmitted from the gNB beams belonging to its serving cell.

However, due to the distinct differences in the radiation patterns of the antenna panels, the following may happen: the UE may be scheduled with a downlink or uplink transmission that it is supposed to receive or transmit using its best antenna panel, and if the UE is performing measurements on a different antenna panel, it may fail to receive the transmission from its serving cell or fail to transmit to its serving cell, when only one antenna panel is active per time instant for radio reception and/or transmission. This may negatively impact the quality of experience, QoE. QoE may be defined as the subjective acceptability of the quality of a telecommunication service perceived by a user. The UE measurements that are performed on alternative antenna panels may also be required for mobility actions, and thus they may not be avoided or delayed too much. When the UE for example moves from one cell to another while in radio resource control, RRC, connected mode, the handover may also involve a change in the best antenna panel. However, if too few, or too late, measurements are performed on antenna panels pointing towards target cells for possible handovers, more radio link failures and/or handover failures may occur.

As described for example in 3GPP TS 38.300, a UE may be configured to perform measurements on gNB beams from one or more cells, and such measurements may be subject to L1 and L3 filtering prior to being reported to the serving gNB. L3 may also be referred to as an RRC layer. L3 filtering parameters and potential reporting criteria may be configurable for example by RRC signalling. However, the gNB may not be aware of which UE antenna panel(s) are active at which times.

In RRC connected mode, a UE may perform radio link monitoring in the active bandwidth part, BWP, based on one or more reference signals, such as SSB and/or CSI-RS, and a signal quality threshold configured by the base station. The UE may declare radio link failure for example if one or more of the following criteria is met: 1) expiry of a timer started after indication of radio problems from the physical layer, 2) random access procedure failure, and/or 3) radio link control failure. After a radio link failure, the UE may stay in RRC connected mode, select a suitable cell, and initiate RRC re-establishment. Alternatively, the UE may enter RRC idle mode for example if a suitable cell was not found within a certain time period after a radio link failure was declared.

For beam failure detection, the gNB may configure the UE with one or more beam failure detection reference signals, such as SSB and/or CSI-RS, and the UE may declare beam failure for example when the number of beam failure instance indications from the physical layer reaches a pre-defined threshold before a pre-defined timer expires. After beam failure is detected, the UE may trigger beam failure recovery by initiating a random access procedure on the cell, and select a suitable beam to perform beam failure recovery on. If the gNB has provided dedicated random access resources for certain beams, those may be prioritized by the UE. Upon completion of the random access procedure, beam failure recovery may be considered to be complete.

Some exemplary embodiments may utilize machine learning, ML, in an apparatus such as a UE to automatically learn, or predict, how to perform antenna panel switching and L1 measurements efficiently in order to balance tradeoffs between key performance indicators, KPIs, that are affected by how the UE performs antenna panel switching and L1 measurements. In other words, some exemplary embodiments may provide ML-driven UE antenna panel control to leverage the tradeoffs for example between link performance, such as throughput, outage and/or latency, and radio link failures, beam failures, and/or handover failures. Some exemplary embodiments may be used for example in a UE, wherein only one antenna panel may be allowed to be active at a time. As a non-limiting example, reinforcement learning, RL, may be used together with gNB-to-UE signalling to guide the UE on how to make tradeoffs between multiple KPIs.

An example of a KPI may be that QoE is in line with 5G quality of service, QoS, class indices, i.e. 5QI. Fulfilling the QoS requirements according to 5QI may require the UE to use its best antenna panel towards the serving cell. Measurements on other antenna panels may cause degraded performance during time instants, wherein such measurements are performed. On the other hand, for the UE to be using its best antenna panel, it may be required to occasionally perform measurements on other antenna panels, since conditions may change so that one of the other antenna panels becomes the best panel.

Another example of a KPI may be beam failure declaration. If a beam failure declaration occurs, it may trigger a beam failure recovery procedure that involves random access, and hence a temporary interruption of the serving cell communication link, i.e. equivalent to a degraded QoE. If the UE is subject to, for example, movement, rotations, and/or local scattering variations, the best antenna panel may change more often, and hence the UE may perform more frequent antenna panel switching to measure on its antenna panels. Therefore, the beam failure probability may be impacted by how and when the UE switches the active antenna panel.

Another example of a KPI may be the radio link failure rate and/or handover failure rate. Handover failures are radio link failures that may occur during handovers. For the UE to be served by its best cell, handovers may be required to be performed in a timely manner. When the UE moves from a first cell to a second cell, the best antenna panel of the UE may be different for the second cell than for the first cell. For efficient handover performance, the UE may therefore occasionally perform measurements on its antenna panels that are pointing towards the one or more target cells, to which it is likely to be handed over.

As a non-limiting example, some exemplary embodiments may be used for example for NR at 28 GHz in a UE comprising a plurality of antenna panels, for example three or four antenna panels. However, it should be appreciated that some exemplary embodiments may be used in other frequency regions as well, and the number of antenna panels may vary.

Reinforcement learning may be based on a state denoted as s, an action denoted as a, and a reward denoted as r. The state s may be defined as a tuple of values, which may also be referred to as features, that describe the environment for the learning software agent in a way that is relevant to the problem at hand. The environment may be defined, for example, as a collection of all the possible states, in which the software agent may be in. The action a determines the next state of the software agent. In other words, performing the action causes transitioning to a new state. The reward r may be defined as a multi-objective scalar function that numerically expresses the purpose of the software agent. The interaction of the software agent with the environment over time may be described by samples of experience represented by tuples $(s_t, a_t, r_{t+1}, s_{t+1})$, wherein t is a discrete time counter describing a state transition as a consequence of applying actions to the environment and receiving rewards. The objective of RL may be to determine, from the samples of experience, a policy p that suggests the next action to take in response to the current state in order to maximize the long-term cumulative reward. Thus, the RL algorithm maps the rewards to previously taken actions. The policy may be defined as a function that takes a state as input, and returns an action as output. The policy may comprise a mapping, or a probability distribution, of state-action pairs that may be used to suggest an action in response to the current state based on a reward function parameterized by a set of adjustable weights. The policy may indicate the probability of each action when the software agent is in a particular state, and the action with the highest probability may be returned as the suggested action.

Figure 2:
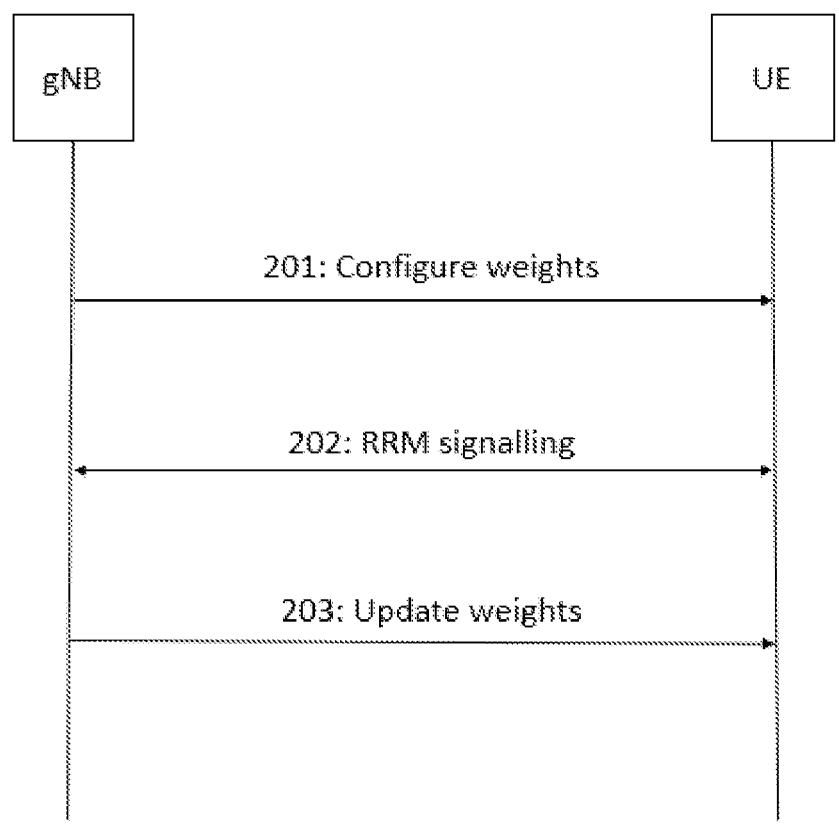
FIG. 2 illustrates a signalling diagram according to an exemplary embodiment.

FIG. 2 illustrates a signalling diagram according to an exemplary embodiment, wherein a UE may be running a machine learning scheme for antenna panel switching. A base station, such as a gNB, configures 201 the UE with relative weights for the reward function of the UE, for example serving cell link performance, beam failure declaration, and/or handover failure declaration. The weights may be weighting factors for each KPI to be used in the reward function to estimate the reward at each time step as a weighted sum. The configuring of the weights may be performed for example as part of a radio resource control, RRC, connection establishment procedure. The weights may be transmitted for example as a vector of scalar weights, for example three scalar weights, with a value between 0 and 1 indicating the relative importance of a KPI associated with the scalar weight. In other words, the weights may indicate how to balance the tradeoffs between different KPIs, such as maximizing the time when the UE is receiving on its best antenna panel, i.e. maximizing serving cell QoE, versus minimizing radio link failures, handover failures, and/or beam failures. The weighted KPIs may be normalized prior to determining, or calculating, the weighted sum of the KPIs. The normalization may be performed, for example, by assigning, or mapping, scalar reward values to the KPI values, i.e. to normalize the real KPI values achievable, or their range of interest, to a range of scalar reward values. As a non-limiting example, the range of scalar reward values may be −50 to +50. However, the reward values may not necessarily be integer numbers, as other data types may be used as well. As another example for performing normalization, reward values may be assigned to KPIs by setting a reward of +1 for good KPI values, for example values within a first pre-defined range, and a −1 reward value for bad KPI values, for example values within a second pre-defined range.

Alternatively, the gNB may explicitly configure which KPIs are to be used in the reward function of the UE, and how they should be weighted. The gNB may configure the UE for example based on the service requirements of the UE. The service requirements may be based on, for example, the 5G QoS class indices, i.e. 5QI, in the transport header of the data packets, and on corresponding QoS parameters, which are signalled via the CN interface when a packet session is established. 5QI is defined for example in 3GPP TS 23.501, and may include information such as the resource type, packet delay budget, packet error rate, data burst volume, etc. As a non-limiting example, the gNB may set different weights for example for ultra-reliable low-latency communication, URLLC, and enhanced mobile broadband, eMBB, services, and/or high and low mobility users. Once configured, the UE may perform machine learning based antenna panel switching based on the configured weights of the reward function.

The UE and gNB may then perform radio resource management, RRM, signalling 202 with each other for mobility purposes, such as timely handovers. For example, the UE may perform RRM measurements, such as reference signal received power, RSRP, and/or reference signal received quality, RSRQ, and then transmit the measurements to the gNB. Based on the measurements, the gNB may then for example estimate a probability for the UE experiencing handovers in the near future. For example, if the UE is reporting high RSRP and/or RSRQ indicating that the UE is far away from the cell edge, the probability of a handover in the near future may be low.

The gNB may then update 203 the relative weights for the UE based on the RRM signalling 202. As an example, if the gNB estimates a low probability for the UE experiencing handovers in the near future, the gNB may configure a low or even zero weight for radio link failures and/or handover failures for the UE to use in its reward function. Thus, the UE may further relax, or reduce, the antenna panel switching it would otherwise perform for the purpose of timely handovers. The gNB may also configure the UE with different weights for the reward function depending on its RRC state, for example having different weights in RRC idle mode and RRC connected mode. However, for the machine learning based scheme of the UE to operate efficiently, it may be beneficial if the weights are not updated too frequently.

In another exemplary embodiment, the machine learning algorithm, or RL algorithm, may be operating in an exploration mode, wherein the software agent performs actions randomly for example with a certain probability in order to gather information about the environment. This may be beneficial in order to allow the software agent to experience all, or most, of the possible states, so that the average reward may be maximized in the long term.

In some exemplary embodiments, if the signalling illustrated in FIG. 2 is not present, the UE may still perform machine learning based antenna panel switching for example based on a hard-coded reward function, or a reward function that it otherwise determines to be appropriate, for example based on 5QI information.

Figure 3:
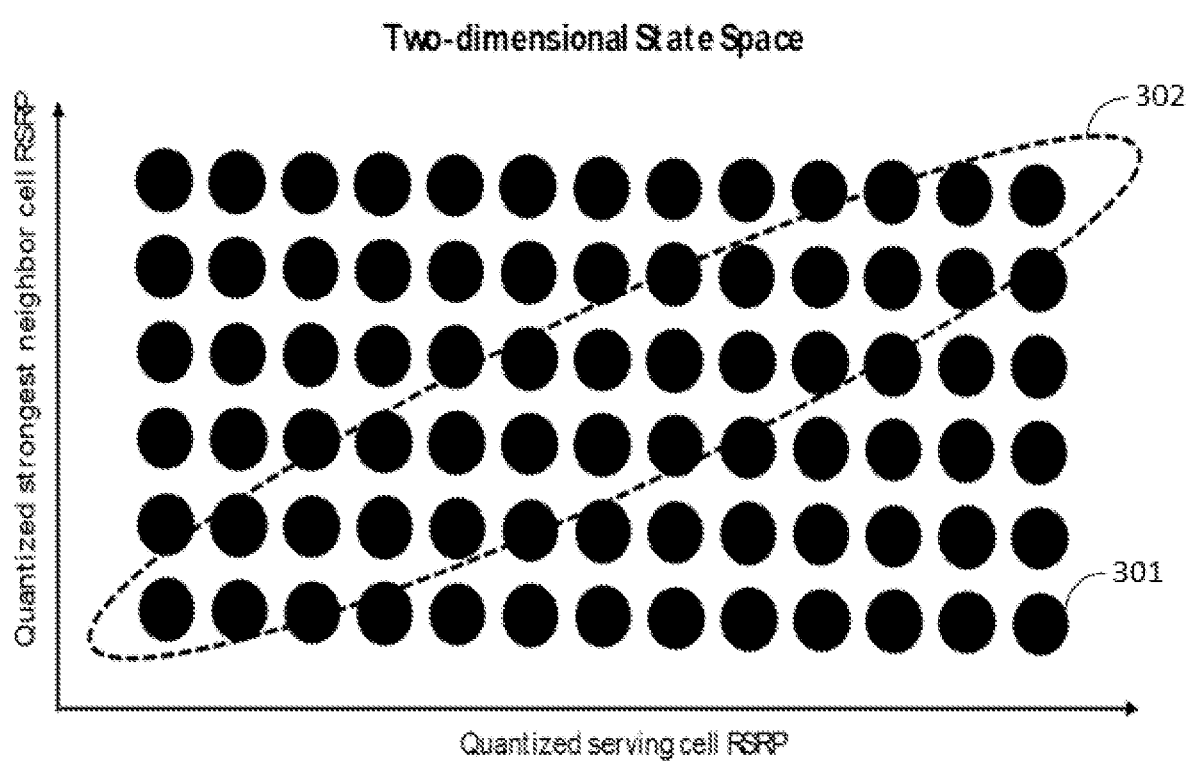
FIG. 3 illustrates a two-dimensional state space for machine learning according to an exemplary embodiment.

FIG. 3 illustrates a two-dimensional state space for machine learning according to an exemplary embodiment. The state space comprises a plurality of states 301. A first dimension, i.e. the X-axis, represents a quantized version of the serving cell quality, measured for example by the received RSRP. It should be appreciated that RSRP is only used as one example herein, and the serving cell quality may also be measured for example by the received SINR on CSI-RS. A second dimension, i.e. the Y-axis, represents a quantized version of the strongest neighbour cell quality, measured for example by RSRP. In other words, a state 301 in the state space may be defined by a quantized measurement of the serving cell quality and strongest neighbour cell quality. A neighbour cell may be defined as another cell adjacent to the serving cell. The diagonal area 301 comprises states indicating a high probability of handovers.

The state space illustrated in FIG. 3 may reflect overall performance, and thus it may be desirable to have the UE operate in a state that is as much to the right as possible, i.e. having a high serving cell quality. At each action, the new state of the UE may be determined by its measurements on the active antenna panel, i.e. by the UE measuring the serving cell quality, such as RSRP. However, the UE may also be required to regularly perform measurements on other antenna panels in order to determine which antenna panel corresponds to the highest received serving cell quality. The UE may then determine that the antenna panel corresponding to the highest received quality is its best antenna panel. When the UE switches to perform measurements on another antenna panel than its currently best one, it may experience a 10-30 dB drop in serving cell quality, while the best neighbour cell quality may be experienced as stronger. If the serving cell is using a grid of beams, the serving cell quality may be measured as the reception quality through the selected beam, as informed to the UE as part of the MAC-based beam management procedure. The UE may also measure the RSRP from neighbour cells. If the neighbouring cells also operate with a grid of beams, the neighbour cell RSRP may be the one corresponding to the strongest beam from the cell. RSRP may be measured for example on beamformed SSBs from the cell.

In another exemplary embodiment, a state space comprising three or more dimensions may be used. For example, in addition to the two dimensions illustrated in FIG. 3, a third dimension may be used to represent the filtered beam failure rate, a fourth dimension may be used to represent the filtered radio link failure rate, and/or a fifth dimension may be used to represent the filtered handover failure rate. Any combination of three or more of these dimensions may be used in this exemplary embodiment. The reward function may be defined as the weighted average of the remaining KPIs, i.e. the ones not in the used state space dimensions, including the QoS metrics. The type and dimensionality of the state space used in the UE may depend on the UE implementation and processing capabilities. The capabilities of the UE in terms of the implemented dimensionality of the state space and corresponding reward functions may be informed to the serving base station at initial call setup in order for the base station to be able to select appropriate scalar weights.

Figure 4:
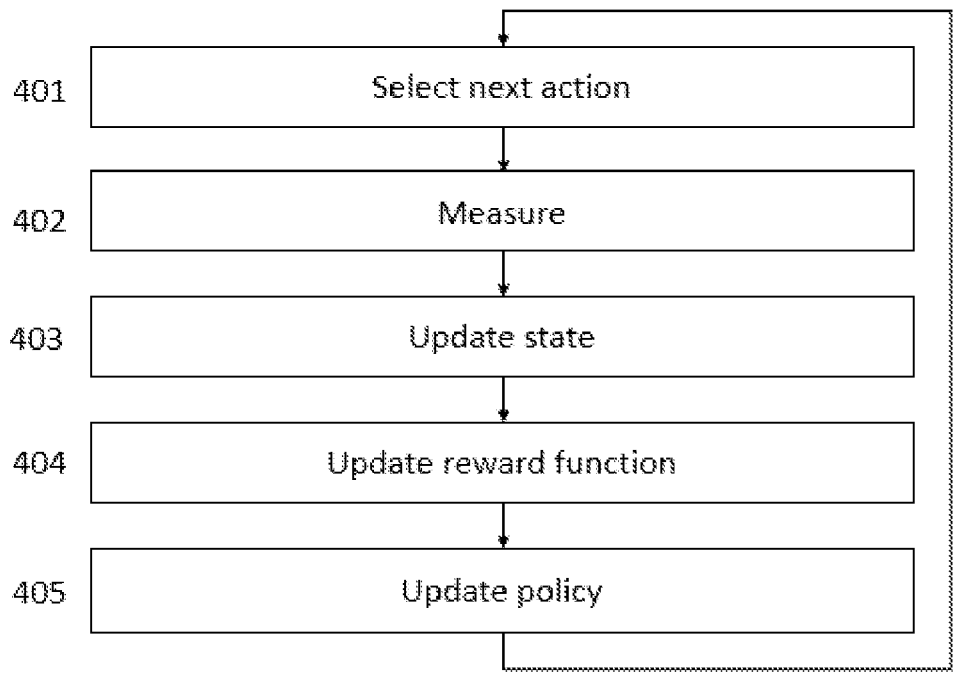
FIGS. 4 and 5 illustrate flow charts according to some exemplary embodiments.

FIG. 4 illustrates a flow chart according to an exemplary embodiment for machine learning based antenna panel switching. The exemplary embodiment illustrated in FIG. 4 may utilize for example the state space illustrated in FIG. 3. The functionalities illustrated in FIG. 4 may be performed by an apparatus such as a UE.

In block 401, a policy is used to select an action to be taken at the next time instant based on the current state and reward function. The selected action indicates which antenna panel from a plurality of antenna panels comprised in the UE is to be used for measurements for example during the next SSB burst. The indicated antenna panel may be the same as the currently active antenna panel, or it may be another antenna panel.

In block 402, the selected action is executed, i.e. the indicated antenna panel is used to measure a quality metric, for example RSRP, of the serving cell and one or more neighbour cells. These measurements may be stored for example in an internal database of the UE, such that the UE may keep track of the strongest received neighbour cell measurements from its antenna panel, and to update 403 the state based on the measurements, i.e. after executing the action.

In block 404, the KPIs that are comprised in the reward function are updated based on the measurements. A new long-term reward scalar value may then be determined, or calculated, as a weighted average of the KPIs for example by using weights received from a base station. The long-term time value may depend on the KPI to be maximized. The time period over which this average return, or reward, is maximized may be another important factor. For example, the environment may be assumed to be constant for a sufficiently long time to allow the agent to learn the best policy. As a non-limiting example, the time horizon for the long-term reward scalar value may be 100-1000 ms, over which the reward may be maximized until the environment is changing too much, and the RL algorithm needs to re-learn the best policy.

As a non-limiting example, the reward function may be a weighted average of KPIs such as the UE's experienced serving cell quality, the experienced long-term beam failure rate, the experienced long-term radio link failure rate and/or the handover failure rate. However, it should be appreciated that the reward function may also comprise different and/or additional KPIs.

In order to maximize long-term performance, the KPIs may be updated iteratively using low pass filtering prior to weighting them and determining the updated reward function. For example, for the serving cell quality KPI, an infinite impulse response, IIR, filter may be used to determine the average experienced RSRP or SINR. If the UE switches to an antenna panel pointing away from the serving cell, this may represented by a lower serving cell RSRP or SINR, and hence a decline of serving cell quality. The IIR may operate on samples expressed in dB or dBm such that a geometrical mean is determined, as this may represent the serving cell performance more accurately. Similarly, for beam failures and handover failures, the rate of those errors may be determined during a sliding window of a pre-defined length. Beam tracking errors may occur more often than handovers, so the sliding window length for monitoring beam failure rate may be shorter than the window used for determining handover failure rates. For example, the length of the sliding windows used by the UE to determine beam failure rates and handover failure rates may be signalled from the base station to the UE as part of the signalling illustrated in FIG. 2.

In block 405, the policy is updated for example by using a Q-learning RL algorithm, or a deep Q-learning algorithm. The objective of the policy may be to optimize long-term performance based on the desired tradeoffs between the KPIs, as indicated by the weights. The UE may learn the Q-function by using the Bellman equation via iterative updates. For example, the Q-values for individual state-action pairs may be stored and updated in a data structure such as a table. As another example, a convolutional neural network may be used for the learning of the data structure tables. Convolutional neural networks may be beneficial for example for high dimensional states and continuous states.

The process illustrated in FIG. 4 may be iterative so that after block 405 it returns to block 401 and continues from there. For example, the process may be run at 20 ms intervals synchronized with SSB bursts transmitted from one or more cells.

In some exemplary embodiments, the UE may return to using its best antenna panel after block 405. Alternatively, the selected antenna panel may be updated as the best antenna panel after block 405, if the serving cell quality of the latest measurements are better on the selected antenna panel in comparison to the measurements recorded in the database for the antenna panel previously determined as the best antenna panel. The UE may then use the best antenna panel for transmitting and/or receiving. However, if the UE is in exploration mode, it may use a randomly selected antenna panel.

In another exemplary embodiment, the process illustrated in FIG. 3 may be used for RRC idle mode by replacing the serving cell quality by camping cell quality. In addition, the base station may configure the UE with different weights for its reward function to use while in RRC idle mode. For example, metrics such as beam failure and handover failure may not be relevant for a UE in RRC idle mode. Also, the camping cell quality target may not be as strict as for example for a UE in RRC connected with URLLC type of service.

Given the finite length of an RRC connected mode state, or an RRC idle mode state, the RL algorithm may be operating in episodic task mode, meaning that the antenna panel selection policy is being updated and applied independently between consecutive RRC connected modes or RRC idle modes of the same UE. For example, two separate RL algorithms may be run independently, i.e. each optimizing their own policy for the connected and idle mode, respectively.

Figure 5:
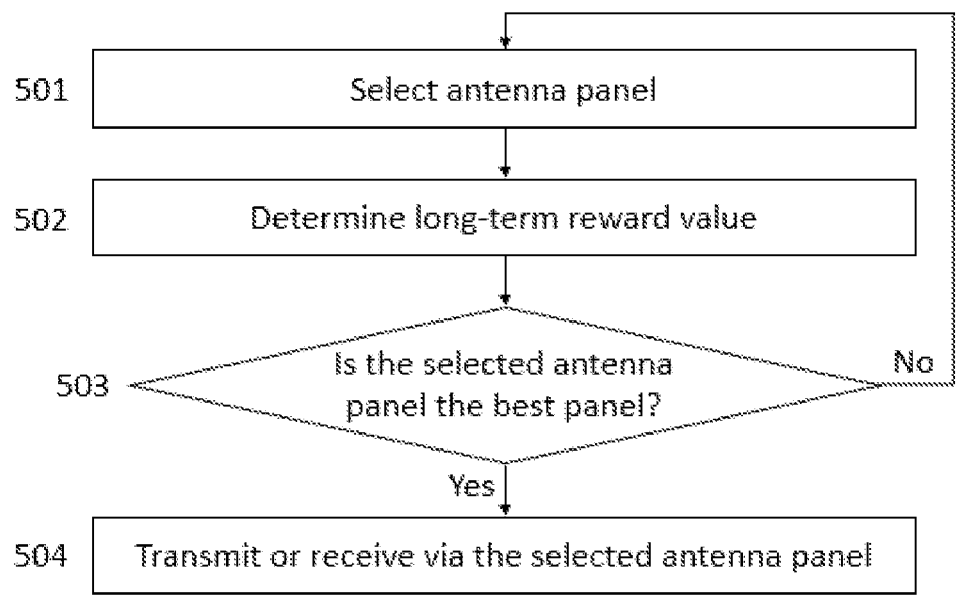

FIG. 5 illustrates a flow chart according to an exemplary embodiment. In block 501, an antenna panel is selected from a plurality of antenna panels by using a machine learning algorithm. In block 502, a first long-term reward value associated with the selected antenna panel is determined based at least partly on one or more first signals received on the selected antenna panel. In block 503, it is evaluated if the determined first long-term reward value exceeds one or more second long-term reward values associated with at least a subset of the plurality of antenna panels. In other words, the one or more second long-term reward values may be associated with the other antenna panels comprised in the plurality of antenna panels. The one or more second long-term reward values may be previously determined long-term reward values that may be stored for example in an internal or external database, such as a table, and obtained therefrom for the evaluation. If the first long-term reward value exceeds the one or more second long-term reward values (503: yes), a second signal is transmitted or received via the selected antenna panel in block 504. If the first long-term reward value does not exceed the one or more second long-term reward values (503: no), the second signal may be transmitted or received via another antenna panel, for example the antenna panel associated with the highest long-term reward value, and the process may return to block 501.

In other words, maximizing the overall long-term reward value may be the main objective of the software agent. The different reward values for selecting each antenna panel may be used in each time step. These immediate reward values may be calculated based on the weighted reward function described earlier, possibly including some filtering. The long-term reward value may then be determined for example as an average or a sum of consecutive immediate reward values for example over a pre-defined time window.

In some exemplary embodiments applying Q-learning, the long-term reward value may be a Q-value, i.e. a state-value, or at least based on the Q-value. In other words, the first long-term reward value described above with regard to FIG. 5 may be based on a first Q-value, and the one or more second long-term reward values may be based on one or more second Q-values. The second signal may then be transmitted or received via the antenna panel associated with the highest Q-value. The estimation of the Q-value may be based on the immediate reward value for each action and time step calculated with the weighted reward function described earlier.

The functions and/or blocks described above by means of FIGS. 2, 4 and 5 are in no absolute chronological order, and some of them may be performed simultaneously or in an order differing from the described one. Other functions and/or blocks may also be executed between them or within them.

Figure 6:
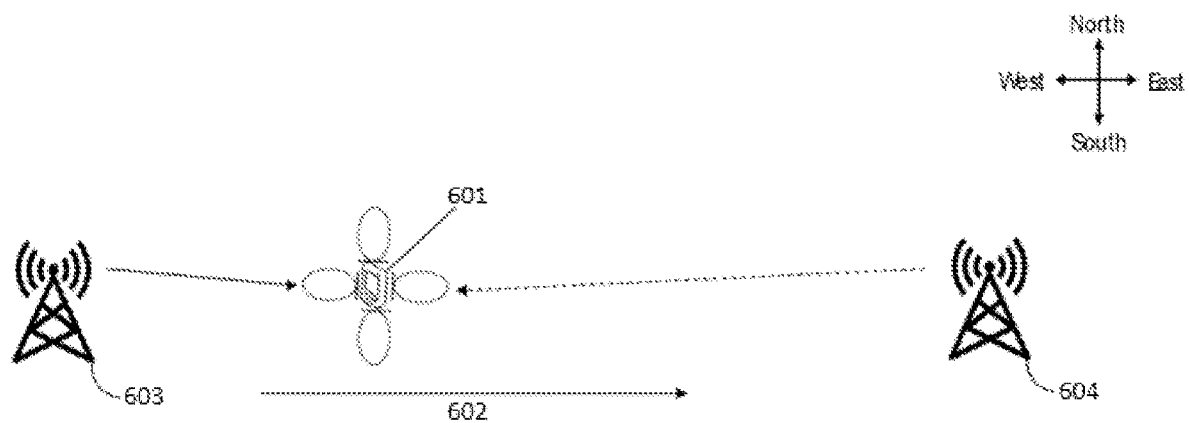
FIG. 6 illustrates an exemplary embodiment with linear UE movement.

FIG. 6 illustrates an exemplary embodiment with linear UE movement. In this exemplary embodiment, a UE 601 is moving from west to east along a trajectory 602. The UE may comprise four antenna panels with the main lobes of the antenna panels pointing to the north, east, south and west, respectively. In this case, the best antenna panel is the antenna panel pointing to the west, i.e. towards the serving cell 603. In other words, when the UE is measuring on the antenna panel pointing to the west, it experiences higher serving cell quality than on the other antenna panels, and it is in a state to the right as illustrated in the state space of FIG. 3. On the other hand, when the UE is measuring on the antenna panel pointing to the east, i.e. towards a neighbour cell 604, it experiences lower serving cell quality but higher neighbour cell quality than on the west antenna panel, and hence it is in a state at the top of the state space illustrated in FIG. 3. When the UE measures on the antenna panel pointing to the north or to the south, the serving cell quality is less than for the west antenna panel, and the neighbour cell quality is less than for the east antenna panel. Therefore, the UE may learn to prioritize doing measurements on the west and east antenna panels, and as it approaches the border between the two cells, it may measure more often on the east panel in order to perform a timely handover. Otherwise, the UE may experience handover failure, causing a drop in the reward function and adjustment of the policy to avoid handover failure from happening again.

Figure 7:
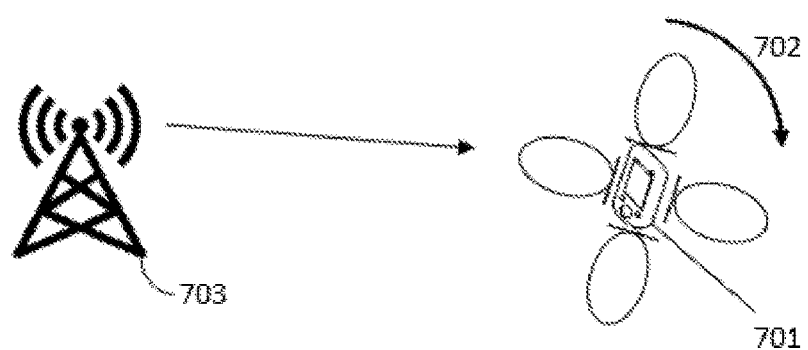
FIG. 7 illustrates an exemplary embodiment with a rotating UE.

FIG. 7 illustrates an exemplary embodiment with a rotating UE. In this exemplary embodiment, a UE 701 is rotating 702, and hence the best antenna panel will be switching as the UE is rotating. The UE may not be subject to handovers in the near future, and therefore it may be only showing the serving cell 703. At a first time instant, a first antenna panel may be the best antenna panel. As the UE rotates, at a second time instant a second antenna panel may become the best antenna panel. If the UE does not switch to the second antenna panel at the second time instant, it may experience beam failure, degradation in the serving cell quality, and/or radio link failure. Therefore, the UE may over time learn to prioritize measurements on the first antenna panel and the second antenna panel during subsequent rotation periods corresponding with the first and second time instant, while giving low priority for measuring on other antenna panels during those periods.

A technical advantage provided by some exemplary embodiments may be that they may enable an apparatus such as a UE to automatically learn when to perform measurements on other antenna panels than the active antenna panel in order to determine which antenna panel offers the best signal quality corresponding to a long-term average time period. By switching at the appropriate time to the antenna panel offering the best signal quality, serving cell quality may be increased, and radio link failures, beam failures, and/or handover failures may be reduced.

Figure 8:
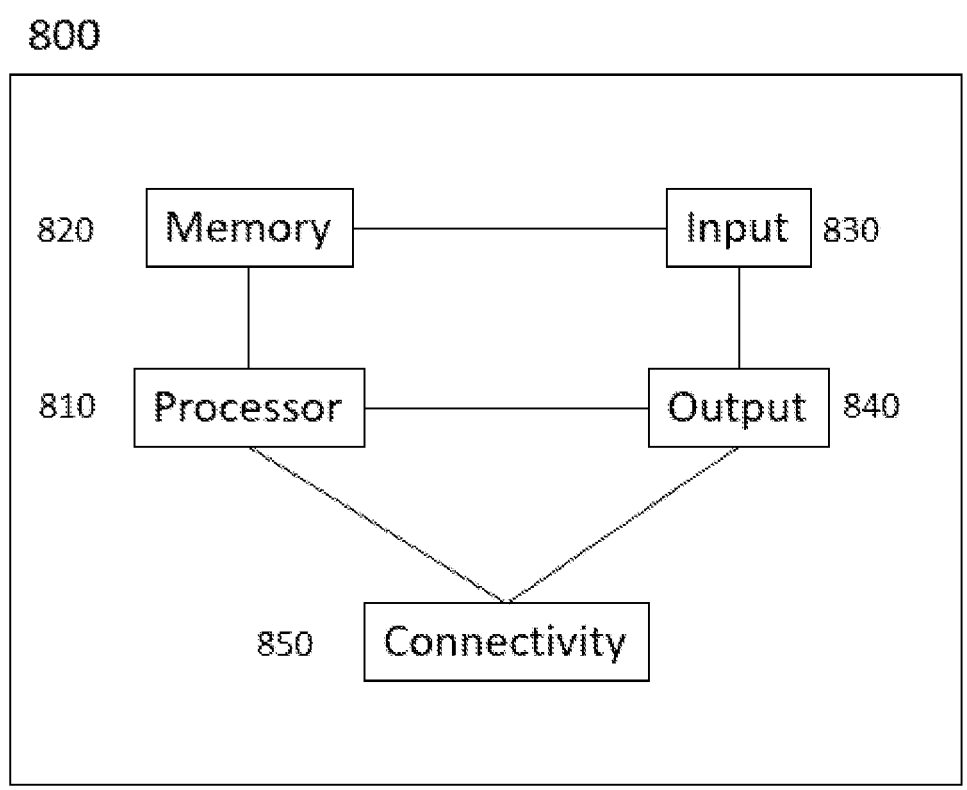
FIGS. 8 and 9 illustrate apparatuses according to exemplary embodiments.

FIG. 8 illustrates an apparatus 800, which may be an apparatus such as, or comprised in, a terminal device, according to an exemplary embodiment. The apparatus 800 comprises a processor 810. The processor 810 interprets computer program instructions and processes data. The processor 810 may comprise one or more programmable processors. The processor 810 may comprise programmable hardware with embedded firmware and may, alternatively or additionally, comprise one or more application specific integrated circuits, ASICs.

The processor 810 is coupled to a memory 820. The processor is configured to read and write data to and from the memory 820. The memory 820 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 820 stores computer readable instructions that are executed by the processor 810. For example, non-volatile memory stores the computer readable instructions and the processor 810 executes the instructions using volatile memory for temporary storage of data and/or instructions.

The computer readable instructions may have been pre-stored to the memory 820 or, alternatively or additionally, they may be received, by the apparatus, via an electromagnetic carrier signal and/or may be copied from a physical entity such as a computer program product. Execution of the computer readable instructions causes the apparatus 800 to perform one or more of the functionalities described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer.

The apparatus 800 may further comprise, or be connected to, an input unit 830. The input unit 830 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 830 may comprise an interface to which external devices may connect to.

The apparatus 800 may also comprise an output unit 840. The output unit may comprise or be connected to one or more displays capable of rendering visual content such as a light emitting diode, LED, display, a liquid crystal display, LCD and a liquid crystal on silicon, LCoS, display. The output unit 840 may further comprise one or more audio outputs. The one or more audio outputs may be for example loudspeakers.

The apparatus 800 further comprises a connectivity unit 850. The connectivity unit 850 enables wireless connectivity to one or more external devices. The connectivity unit 850 comprises at least one transmitter and at least one receiver that may be integrated to the apparatus 800 or that the apparatus 800 may be connected to. The at least one transmitter comprises at least one transmission antenna, and the at least one receiver comprises at least one receiving antenna. The connectivity unit 850 may comprise an integrated circuit or a set of integrated circuits that provide the wireless communication capability for the apparatus 800. Alternatively, the wireless connectivity may be a hardwired application specific integrated circuit, ASIC. The connectivity unit 850 may comprise one or more components such as a power amplifier, digital front end, DFE, analog-to-digital converter, ADC, digital-to-analog converter, DAC, frequency converter, (de)modulator, and/or encoder/decoder circuitries, controlled by the corresponding controlling units.

It is to be noted that the apparatus 800 may further comprise various components not illustrated in FIG. 8. The various components may be hardware components and/or software components.

Figure 9:
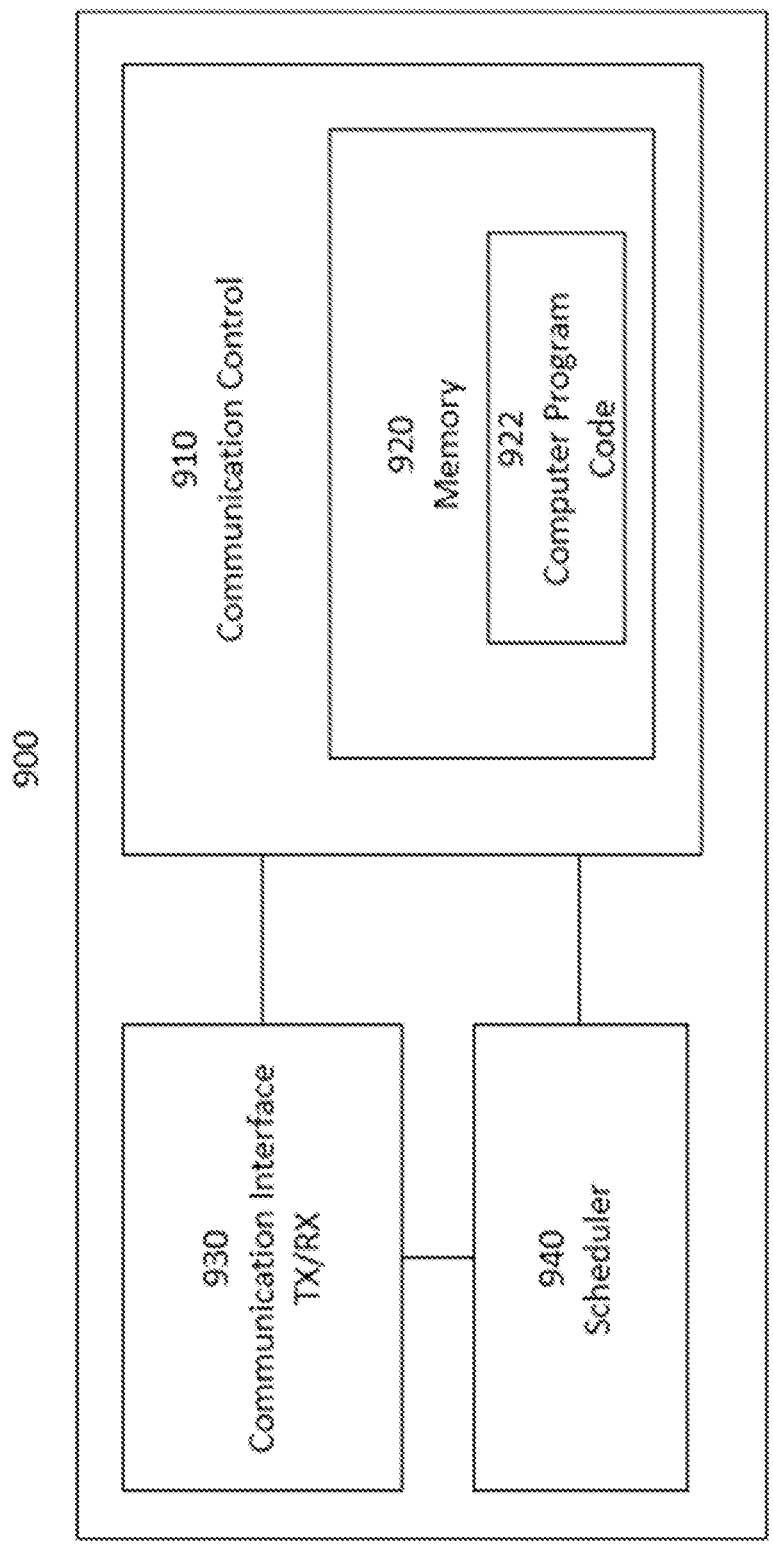

The apparatus 900 of FIG. 9 illustrates an exemplary embodiment of an apparatus such as, or comprised in, a base station such as a gNB. The apparatus may comprise, for example, a circuitry or a chipset applicable to a base station to realize some of the described exemplary embodiments. The apparatus 900 may be an electronic device comprising one or more electronic circuitries. The apparatus 900 may comprise a communication control circuitry 910 such as at least one processor, and at least one memory 920 including a computer program code (software) 922 wherein the at least one memory and the computer program code (software) 922 are configured, with the at least one processor, to cause the apparatus 900 to carry out some of the exemplary embodiments described above.

The memory 920 may be implemented using any suitable data storage technology, such as semiconductor-based memory devices, flash memory, magnetic memory devices and systems, optical memory devices and systems, fixed memory and removable memory. The memory may comprise a configuration database for storing configuration data. For example, the configuration database may store a current neighbour cell list, and, in some exemplary embodiments, structures of the frames used in the detected neighbour cells.

The apparatus 900 may further comprise a communication interface 930 comprising hardware and/or software for realizing communication connectivity according to one or more communication protocols. The communication interface 930 may provide the apparatus with radio communication capabilities to communicate in the cellular communication system. The communication interface may, for example, provide a radio interface to terminal devices. The apparatus 900 may further comprise another interface towards a core network such as the network coordinator apparatus and/or to the access nodes of the cellular communication system. The apparatus 900 may further comprise a scheduler 940 that is configured to allocate resources.

As used in this application, the term "circuitry" may refer to one or more or all of the following:
  a. hardware-only circuit implementations (such as implementations in only analog and/or digital circuitry) and
  b. combinations of hardware circuits and software, such as (as applicable):
    i. a combination of analog and/or digital hardware circuit(s) with software/firmware and
    ii. any portions of hardware processor(s) with software (including digital signal processor(s)), software, and memory(ies) that work together to cause an apparatus, such as a mobile phone, to perform various functions) and
  c. hardware circuit(s) and or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. An apparatus, comprising:
    at least one processor; and
    at least one memory including computer program code, wherein the at least one memory and the computer program code are configured, with the at least one processor, to cause the apparatus to:
    use a machine learning algorithm to select an antenna panel from a plurality of antenna panels;
    determine a first long-term reward value associated with the selected antenna panel based at least partly on one or more first signals received on the selected antenna panel, wherein the first long-term reward value is an average or a sum of consecutive immediate reward values over a first time window, wherein the consecutive immediate reward values are based at least partly on a plurality of key performance indicators comprising at least a serving cell quality metric and a beam failure rate;
    transmit or receive a second signal via the selected antenna panel, if the first long-term reward value exceeds one or more second long-term reward values associated with at least a subset of the plurality of antenna panels.

2. The apparatus according to claim 1, wherein the machine learning algorithm is based on reinforcement learning.

3. The apparatus according to claim 1, wherein the machine learning algorithm is based on a state space comprising at least two dimensions, wherein a first dimension indicates the serving cell quality metric, and a second dimension indicates a neighbour cell quality metric.

4. The apparatus according to claim 1, wherein the antenna panel is selected by using a policy to select an action corresponding with the selected antenna panel based at least partly on a current state and a reward function, wherein the reward function is based on a plurality of weights.

5. The apparatus according to claim 4, wherein the plurality of weights are scalar values indicating a priority for maximizing the serving cell quality metric, minimizing the beam failure rate, minimizing a radio link failure rate and/or minimizing a handover failure rate.

6. The apparatus according to claim 4, wherein the apparatus is further caused to obtain the plurality of weights from a base station.

7. The apparatus according to claim 4, wherein the apparatus is further caused to:
    measure a quality metric associated with the one or more first signals received on the selected antenna panel;
    update the state, the reward function and the policy based at least partly on the measured quality metric.

8. The apparatus according to claim 7, wherein the policy is updated by using Q-learning to update a Q-value for one or more state-action pairs.

9. The apparatus according to claim 7, wherein the apparatus is further caused to:
 transmit the measured quality metric to the base station;
 receive an updated plurality of weights from the base station.

10. The apparatus according to claim 7, wherein the quality metric comprises a reference signal received power value or a signal-to-interference-plus-noise ratio value.

11. The apparatus according to claim 1, wherein the one or more second long-term reward values are obtained from a database.

12. The apparatus according to claim 1, wherein the one or more first signals comprise at least a serving cell signal and a neighbour cell signal.

13. A system, comprising:
 a terminal device; and
 a base station;
 wherein the terminal device is configured to:
 use a machine learning algorithm to select an antenna panel from a plurality of antenna panels;
 receive one or more first signals from the base station via the selected antenna panel;
 determine a first long-term reward value associated with the selected antenna panel based at least partly on the one or more first signals received on the selected antenna panel, wherein the first long-term reward value is an average or a sum of consecutive immediate reward values over a first time window, wherein the consecutive immediate reward values are based at least partly on a plurality of key performance indicators comprising at least a serving cell quality metric and a beam failure rate;
 transmit or receive a second signal via the selected antenna panel, if the first long-term reward value exceeds one or more second long-term reward values associated with at least a subset of the plurality of antenna panels;
 and wherein the base station is configured to:
 transmit the one or more first signals to the terminal device;
 receive or transmit the second signal from or to the terminal device.

14. A method, comprising:
 using a machine learning algorithm to select an antenna panel from a plurality of antenna panels;
 determining a first long-term reward value associated with the selected antenna panel based at least partly on one or more first signals received on the selected antenna panel, wherein the first long-term reward value is an average or a sum of consecutive immediate reward values over a first time window, wherein the consecutive immediate reward values are based at least partly on a plurality of key performance indicators comprising at least a serving cell quality metric and a beam failure rate;
 transmitting or receiving a second signal via the selected antenna panel, if the first long-term reward value exceeds one or more second long-term reward values associated with at least a subset of the plurality of antenna panels.

15. The method according to claim 14, wherein the machine learning algorithm is based on reinforcement learning.

16. The method according to claim 14, wherein the machine learning algorithm is based on a state space comprising at least two dimensions, wherein a first dimension indicates the serving cell quality metric, and a second dimension indicates a neighbor cell quality metric.

17. The method according to claim 14, wherein the antenna panel is selected by using a policy to select an action corresponding with the selected antenna panel based at least partly on a current state and a reward function, wherein the reward function is based on a plurality of weights.

18. The method according to claim 17, wherein the plurality of weights are scalar values indicating a priority for maximizing the serving cell quality metric, minimizing the beam failure rate, minimizing a radio link failure rate or minimizing a handover failure rate.

19. The method according to claim 17, wherein the plurality of weights are obtained from a base station.

20. The method according to claim 17, further comprising:
 measuring a quality metric associated with the one or more first signals received on the selected antenna panel; and
 updating the state, the reward function and the policy based at least partly on the measured quality metric.

* * * * *